Dec. 10, 1968

G. H. FIEDLER ET AL
CONTROL FOR COMBINED HEATING-COOLING
AIR CONDITIONING UNIT

Filed June 15, 1967

INVENTORS
GEORGE H. FIEDLER
ANTHONY R. PASSARELLO
WILLIAM E. TAGGART

BY

*Baldwin, Doran & Egan*

ATTORNEYS

INVENTORS
GEORGE H. FIEDLER
ANTHONY R. PASSARELLO
WILLIAM E. TAGGART
BY

Baldwin, Dorand Egan
ATTORNEYS

INVENTORS
GEORGE H. FIEDLER
ANTHONY R. PASSARELLO
WILLIAM E. TAGGART
BY
Baldwin, Doran & Egan
ATTORNEYS United States Patent Office 3,415,309
Patented Dec. 10, 1968

3,415,309
CONTROL FOR COMBINED HEATING-COOLING
AIR CONDITIONING UNIT
George H. Fiedler, Milan, Anthony R. Passarello, and
William E. Taggart, Bellevue, Ohio, assignors to Johnson Corporation, Bellevue, Ohio, a corporation of Ohio
Filed June 15, 1967, Ser. No. 646,262
10 Claims. (Cl. 165—26)

ABSTRACT OF THE DISCLOSURE

A control system for a combined heating-cooling air conditioner unit wherein the heating section of the unit contains a standing pilot light for igniting the main burners of the unit when heat is required, and wherein control means is provided in conjunction with the thermostat for the unit, for shutting down the pilot whenever the thermostat circuit calls for cooling and for permitting lighting of the pilot only when the thermostat circuit calls for heating. Such an arrangement increases the cooling capacity of the air conditioner unit since the cooling air does not pick up any heat from the "off" pilot and condensation from the pilot combustion is eliminated during the cooling cycle. The unit contains an exhaust blower and sealed combustion chamber, with the blower drawing the combustion products out of the heat exchanger to force such combustion products exteriorly of the unit. A draft switch is provided in the vent of the unit for automatically shutting off the gas valve controlling the gas flow to the burners, if the pressurized flow of combustion products through the vent is interrupted. Also, if for any reason the flue gases are not exhausted from the unit and the temperature increases beyond a predetermined limit in the heat exchanger area of the unit, a link fuse means located adjacent the heat exchanger area is adapted to melt, shutting down the unit by interrupting the flow of fuel to the burners of the unit.

This invention relates to a control system for a combined heating-cooling air conditioner unit, and more particularly to a control system for a combined heating-cooling air conditioning unit wherein the heating portion contains a standing pilot light for igniting the main burners of the unit when heat is required, and wherein means is provided in conjunction with the thermostat control for the heating-cooling unit, for shutting off the pilot whenever the thermostat circuit calls for cooling, and permitting lighting of the pilot only when the thermostat circuit calls for heating.

Combined heating and cooling units for selectively heating or cooling an enclosed area, such as an apartment or the like, are known in the art. One such combined heating-cooling unit is disclosed in the copending United States patent application Ser. No. 591,555, filed Nov. 2, 1966 in the name of Thomas Hildreth. The heating portion of prior art heating-cooling air conditioning units conventionally contains a standing pilot arrangement which ignites the main burners of the unit when heat is required. Such a continuously "on" pilot produces considerable heat, and during the cooling cycle, the cooling air conventionally passes over or around the heat exchanger, and the cooling capacity is reduced because of the heat given off from the pilot.

The present invention provides a control system for a combined heating-cooling air conditioning unit for heating and/or cooling a space in a building or the like, and wherein the heating portion of the unit contains a pilot serving to ignite the main burners when heat is required, and with means provided in conjunction with the thermostat for the unit, for shutting off the pilot whenever the thermostat circuit calls for cooling and for turning on or lighting the pilot when the thermostat circuit calls for heating. Control switch means is also provided in the flue or vent for the unit, which flue or vent contains an exhaust blower, for shutting down the flow of fuel to the burners in the event that the flow of pressurized flue gases through the vent is interrupted. Moreover fusible link means is provided adjacent the combustion chamber area for shutting down the flow of fuel gases to the burners of the unit if the temperature in the combustion chamber increases beyond a predetermined limit due to the non-exhaustion of flue gases from the combustion chamber, and causes melting of said link means.

Accordingly, an object of the invention is to provide a novel control system for a combined heating-cooling air conditioning unit for a building or the like.

Another object of the invention is to provide a novel control system for a combined heating-cooling air conditioning unit, with the heating section of the unit containing a pilot for igniting the main burners when heat is required, and with means being provided in conjunction with the control thermostat for the unit, for shutting down the pilot whenever the thermostat circuit is set for cooling, and for permitting lighting of the pilot only when the thermostat circuit is set for heating.

A further object of the invention is to provide a control system of the above-discussed type including control switch means disposed in the vent or flue of the unit, for shutting down the flow of fuel to the burners of the unit in the event that the flow of pressurized flue gases through the vent is interrupted.

A still further object of the invention is to provide a control system of the above-discussed type including fusible means positioned adjacent the closed combustion chamber of the unit for shutting down the flow of fuel to the burners of the unit in the event that the temperature in the combustion chamber increases beyond a predetermined limit due, for instance, to failure of exhausting of the flue gases from the combustion chamber, resulting in melting of the fusible means.

Other advantages of the invention will be apparent from the following description taken in conjunction with the accompanying drawings wherein:

FIGURE 1 is a generally perspective front and side view of a heating-cooling unit of the type with which the control system may be readily embodied, and with the portions of the unit's housing being broken away. The heating-cooling air conditioning unit illustrated is of a construction wherein the cooling section of the unit is removable from the unit's housing for ready cleaning and repair thereof, and the cooling section is shown in a "pulled out" condition, ready for removal.

FIGURE 2 is a side elevational, partially broken, generally diagrammatic view of a combined heating-cooling air conditioning unit, illustrating with dot-dash arrows the flow of combustion gases through the combustion chambers of the unit and out the vent to exteriorly of the unit, and showing with full line arrows the flow of cycled air past the heat exchanger sections of the unit to the upper air chamber for distribution to the building space to be heated or cooled.

FIGURE 4 is an enlarged side elevational generally diagrammatic illustration of the exhaust blower adapted for exhausting the combustion gases through the vent of the unit, and illustrating the control switch mounted thereon for causing shutting off the flow of fuel to the burners of the unit in the event that the flow of pressurized flue gases through the vent is interrupted.

FIGURE 5 is an end elevational view taken generally along the plane of line 5—5 of FIGURE 4 looking in the direction of the arrows.

Referring now again to the drawings, the heating-cooling unit generally includes a housing or cabinet 10 in which the heating section 12 and the cooling section 14 are adapted for assembly.

Figure 1:
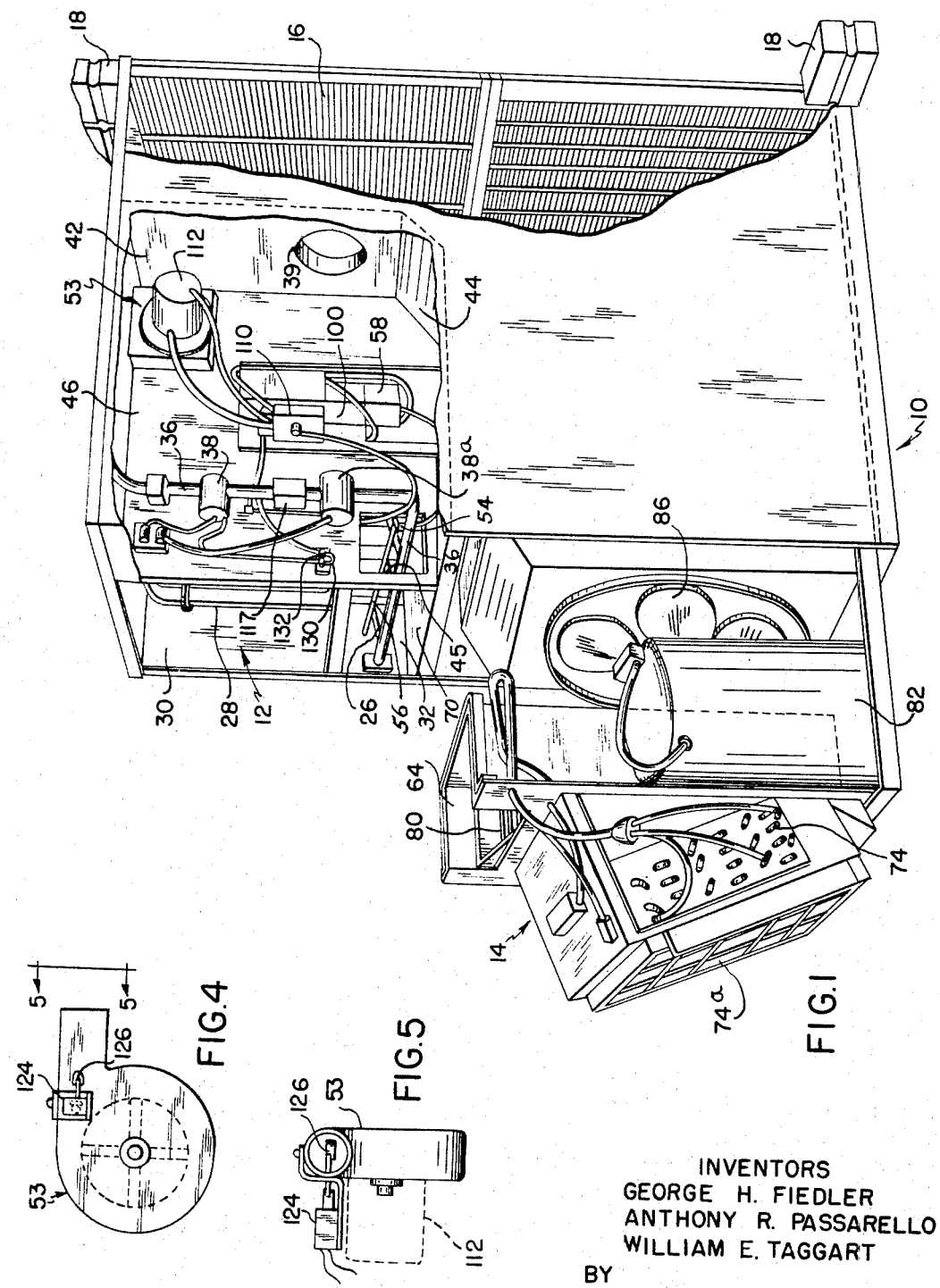

The combined heating-cooling air conditioning unit illustrated is adapted for installation within a room of a building and may be mounted substantially as shown in FIGURE 1 so that the back louvered wall 16 of the unit is generally flush with the exterior wall 18 of the building, with the building wall 18 having an opening therein into which the unit fits.

Figure 2:
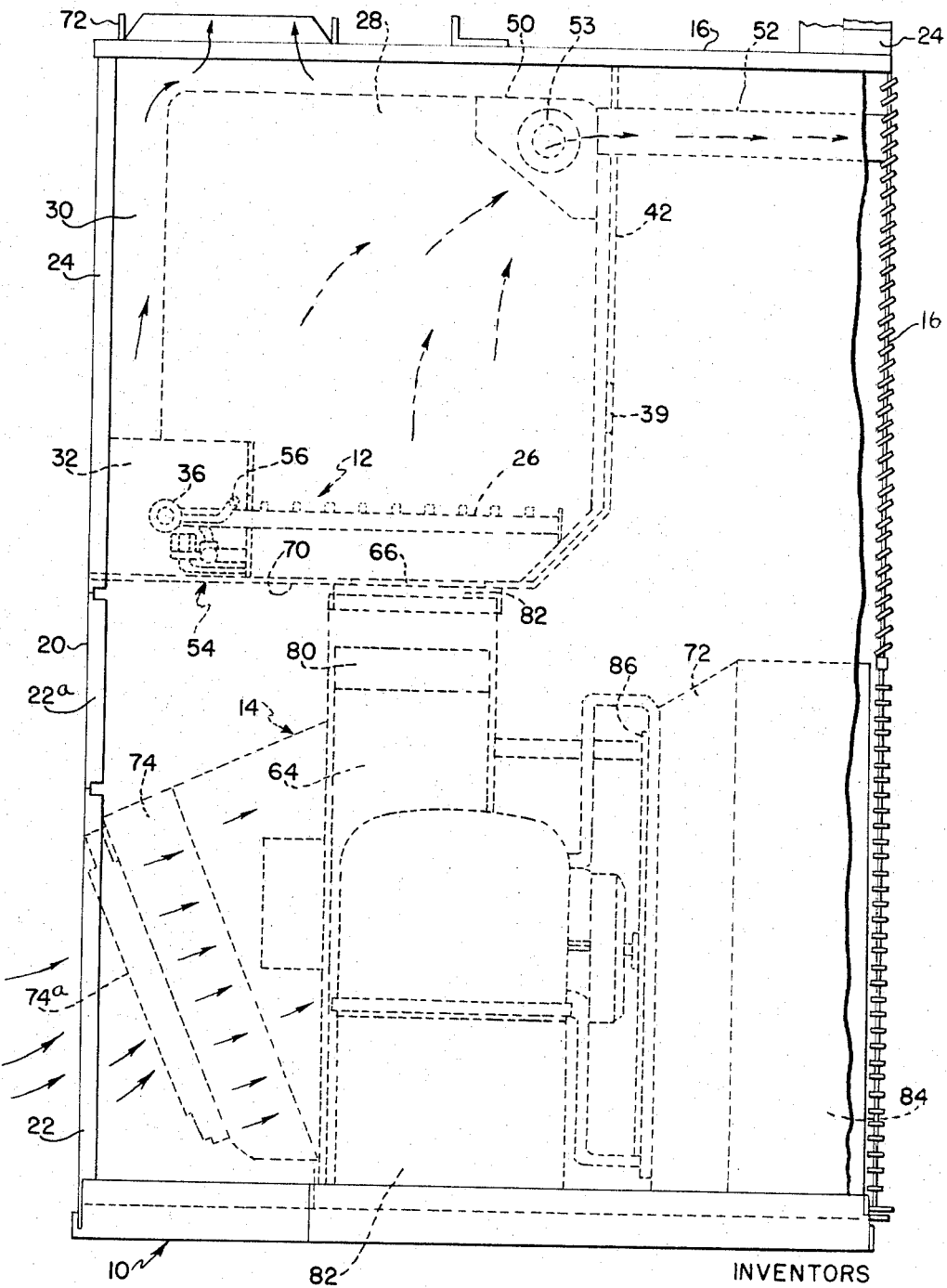

The front surface 20 (FIGURE 2) of the unit's housing 10 may be provided with openings having removable panels or doors associated therewith to give convenient access to the interior of the housing, and in this connection and referring in particular to FIGURE 2, lower louvered panel 22 and upper panel 22a may cover the opening in surface 20 through which the cooling section 14 is adapted for insertion into the housing, and panel 24 may cover the front surface leading to the heating section, including the closed combustion chambers and heat exchange portions of the unit.

The heating section 12 of the combined heating-cooling unit is preferably disposed in the upper portion of the housing 10 as illustrated, and includes laterally spaced gas burner tubes 26 (FIGURES 1 and 2) each of which extends into an upstanding hollow, preferably metallic, heat exchange or heat transfer member 28, forming a closed combustion chamber. Members 28 all extend upwardly relative to the housing 10 and are disposed in the upper air chamber 30, and at their lower ends communicate with air-gas mixing chamber 32 containing gas supply pipe 36 through which a flow of gas to the burners 26 is controlled by a plurality of conventional electro-responsive gas valve mechanisms 38, 38a. Suitable valves 38, 38a may be those designated as #3824A manufactured by Essex Wire Corporation of RBM/Alpha Tafeo, Logansport, Ind.

The air to support the gas combustion is drawn through opening 39 in inner panel 42 of the enclosed chamber 44 (FIGURE 1) the latter being disposed laterally of upper air chamber 30. The combustion air then passes from chamber 44 through opening 45 in inner panel 46 (FIGURE 1) and into chamber 32 and thence into members 28, where it combines with the gas issuing from the burners 26. The air-gas combustion mixture at the burners is confined within the burner enclosing hollow heat transfer members 28, which at their upper ends communicate with a manifold 50 (FIGURE 2) which in turn is coupled to vent 52 which discharges to the atmosphere through the upper section of outside wall 16 of the unit. A motor driven combustion blower 53 is provided in communication with vent 52 for causing the flow of outside air through outer wall 16 and through opening 39 in interior panel 42 into air-gas mixing chamber 32, through the hollow heat exchange members 28 and out vent 52.

Figure 6:
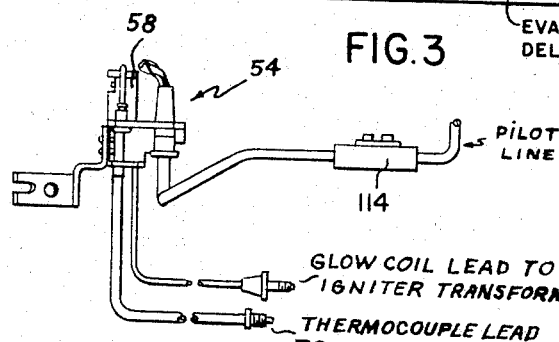
FIGURE 6 is a fragmentary, generally diagrammatic illustration of the pilot light assembly including the glow coil.

A pilot light assembly 54 (FIGURE 6) and an associated flame runner tube 56 (FIGURES 1 and 2) is provided in conjunction with the main burners for igniting the latter. The pilot light assembly includes an igniter 58 having an electric glow coil 60 for igniting the pilot and thus igniting the main burners 26 when the control thermostat 62 (FIGURE 3) for the unit calls for heat.

The air which is conditioned by the heating-cooling unit and which is discharged into the room or area to be heated or cooled, is maintained separate from the outside air and the gas combustion air, since it flows through louvered panel 22, up through chute 64, through opening 66 in horizontal panel 70, up around the outside of the spaced heat transfer members 28 in upper air chamber 30, and then out, for instance, opening 72 for transmittal as for instance by duct work or the like (not shown) to the desired building area.

The cooling section 14 of the combined heating-cooling unit is preferably contained within the lower portion of the housing 10, as shown, and may be mounted so as to be readily removable from such housing as illustrated, for instance, in FIGURE 1. The cooling section may include conventional cooling coils 74 positioned at the inner end of the cooling section with the outer surface 74a of the cooling coil portion being foraminous or open to permit entrance of the room or return air which may be drawn in between the cooling coils by operation of electrically driven blower 80 disposed in chute 64. The cooling section may also include a conventional compressor 82 and condenser coils 84 adapted for disposal adjacent the foraminous outer wall surface 16 of the housing, and a condenser fan 86 may be provided inwardly of the coils, for drawing outside air through the condenser coils and then passing it back out through the upper portion of the exterior wall 16 of the unit in the conventional manner. Accordingly, the condenser fan draws the air in from the outside through the foraminous lower portion of the housing outer wall 16, which air passes over and around the condenser coils 84 extracting heat therefrom, and then this heated air is discharged back to the outside through the upper portion of the outside wall 16 of the unit. It will be understood that such outside cooling air is maintained separate from the cooled air produced by the cooling coils 74 of the cooling section 14 for cooling the building space, by chute structure 64 extending across the lower portion of the housing 10, and panel 42 extending across the upper portion of housing 10 and coacting with chute structure 64.

Figure 3:
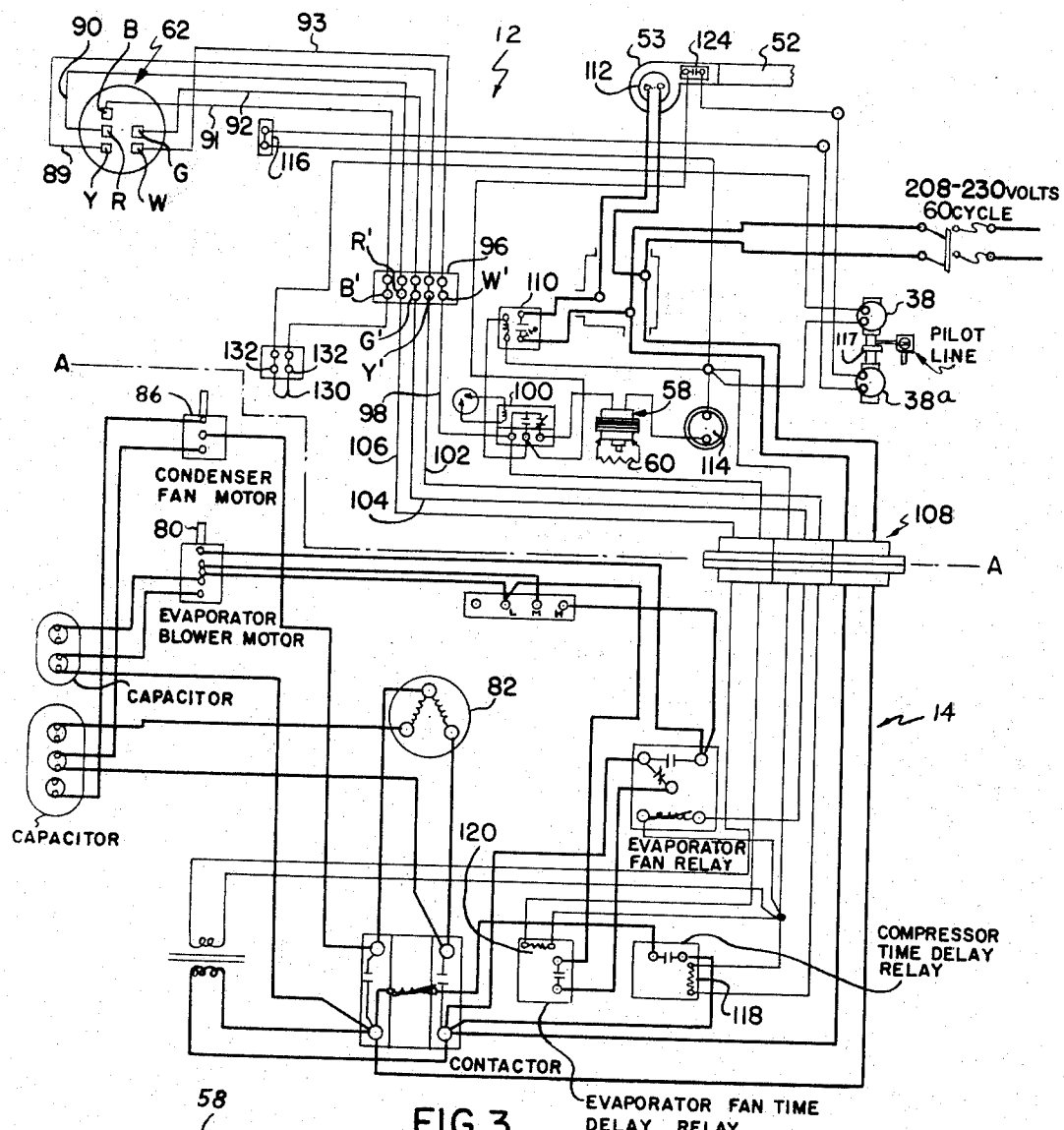
FIGURE 3 is a schematic illustration of the control system for the heating-cooling unit and including the heating section on the upper portion of the drawing above the dot-dashed dividing line A—A and the cooling section on the lower portion of the drawing below the dot-dashed dividing line A—A.

A thermostat 62 (FIGURE 3) is provided as aforementioned for controlling the operation of the heating-cooling air conditioning unit. The thermostat may be a conventional item with a Camstat No. T16 thermostat having a cooling base No. CB34-19 having been found to be suitable. This thermostat is manufactured by Camstat Incorporated of Los Angeles, Calif. The thermostat has five contacts thereon for connection with respectively five wires 89, 90, 91, 92 and 93, leading to a terminal block 96 located on the unit housing. These contacts of the thermostat have been identified by letters Y, R, B, G and W respectively with the connections on the terminal block 96 being designated by similar letters with the prefix prime being added thereto. Line 98 extends from terminal W' on the terminal block to the pilot switch 100 of the unit's control (FIGURE 3). Lines 102, 104 and 106 extend from respectively terminals Y', G' and R' on the terminal block to the multi-circuit plug 108 which intercouples the controls for the cooling section 14 to those of the heating section 12 of the combined heating-cooling unit. The operating condition of such circuitry is such that when the thermostat 62 is set for heating, thermostat contacts R, B and W are closed, while thermostat contacts G and Y are open. When the thermostat is set for cooling, thermostat contacts R, G and Y are closed and thermostat contacts B and W are open.

Accordingly it will be seen that when the thermostat 62 has been set for cooling, or, in other words, when contacts R, G and Y are closed, the contact W is open, thus deactivating the pilot switch 100 and thus deactivating pilot igniter 58 to maintain the pilot in "off" condition. Accordingly during the cooling cycle when cooled air from cooling section 14 is passing around the heat exchanger elements 28 to opening 72, the pilot light is "off" and is not producing any heat. Thus the cooling capacity of the unit is materially enhanced.

When the thermostat 62 is set for heating, or, in other words, when contacts R, B, and W are closed, the pilot switch is activated thereby permitting energization of the glow coil 60 of the igniter, and providing for ignition of the pilot to thus provide for ignition of the main burners when the thermostat calls for heat. It will be seen, therefore, that none of the cooling capacity as provided by the compressor 82 and cooling coils 74 of the cooling section is wasted in cooling the heat from a pilot but instead is all utilized in cooling the space in the building to be cooled by the unit.

Reference No. 110 designates a combustion blower relay in circuit with the motor 112 of the combustion blower, and reference No. 114 designates a pressure switch in the pilot line which will prevent lighting of the pilot if the gas pressure in the pilot line is below a predetermined minimum (e.g. two inches of water column). A normally closed bonnet limit switch 116 is also preferably provided in circuit with the pressure switch 114 and electro responsive gas valves 38, 38a, for limiting the maximum temperature in the upper air chamber 30. A conventional gas pressure regulator 117 may be provided intermediate control valves 38 and 38a.

The compressor circuit is controlled by a time delay relay 118. Such relay may be set to close the compressor circuit approximately one and one-half minutes after the thermostat circuit closes for the cooling cycle. A similar delay will occur when the thermostat circuit opens, before the compressor stops, after the thermostat is satisfied. A time delay relay 120 closes the circuit to blower 80 whenever the thermostat calls for heat. The blower 80 will start approximately one minute after the thermostat closes during the heating cycle (i.e. contacts R, B and W closed) and will stop approximately one-half minute after the thermostat is satisfied. When the thermostat 62 is set for cool (i.e. contacts R, G and Y closed) the blower 80 will start whenever the thermostat calls for cooling and will stop when the thermostat is satisfied. A fan switch is also preferably provided on the thermostat which will bring the blower 80 on for continuous operation when such fan switch is set for "on" (i.e. thermostat contacts R and G are closed). With the latter-mentioned thermostat fan switch set for "automatic" operation, the blower 80 will cycle corresponding with the thermostat cycling. As can be seen from FIGURE 3, the motor of blower 80 is preferably a two-speed motor including a high speed and a low speed, with the high speed being utilized during cooling operations by the unit.

The aforementioned exhaust combustion blower 53 has a sail switch member 124 (FIGURES 3, 4 and 5) associated therewith so that when the blower 53 is operating, the actuator member 126 extending into the vent passageway is moved to a position that closes the limit switch 124, and permits passage of fuel gas through the gas control valve 38a to the burners 26. However, in the event that for some reason the flow of gases through the vent 52 would be interrupted, say for instance due to the burning out of the motor 112 of the blower fan, then the spring loaded actuator 124 of the switch would open the switch, thus opening the circuit to the control valve 38a, and interrupting the flow of fuel gas to the main burners, thus shutting down the heating section.

Referring now to FIGURES 1 and 3, it will be seen that the control circuit includes a fusible link 130 mounted on the inner metallic panel wall 46 and electrically coupled to the gas valve 38 controlling the flow of fuel to the burner assembly. If for any reason the temperature in chamber 44 rises above a predetermined maximum, such as could happen if the flue gases are not properly exhausted from the unit through the vent 52 then the increase in temperature will melt link 130 shutting off the flow of fuel gases to the burners. Such link which is readily replaceable by means of the threaded fasteners 132 on either end thereof is adapted to carry ten amps of current and is adapted to melt, for instance, at 350° F., so as to protect the unit from overheating.

From the foregoing description and the accompanying drawings it will be seen that the invention provides a novel control system for a heating-cooling air conditioning unit, and wherein means is provided in conjunction with a thermostat for controlling the unit, so that the pilot light for the heating section of the unit is deenergized when the thermostat is set for cooling by the unit, and wherein the pilot is automatically energized for igniting the burners of the unit only when the thermostat is set to call for heat. The invention also provides a control system for a combined heating-cooling air conditioning unit wherein means is provided in the vent of the unit for cutting off the flow of fuel gas to the burners in the event that the flow of combustion gases through the vent is interrupted or prevented, and also fusible control means is provided for shutting off the flow of fuel gases to the burners in the event of a predetermined increase in the temperature in the combustion chambers of the unit, to thereby cause shutting down of the unit.

The terms and expressions which have been used are used as terms of description and not of limitation, and there is no intention in the use of such terms and expressions of excluding any equivalents of any of the features shown or described, or portions thereof, and it is recognized that modifications are possible within the scope of the invention claimed.

We claim:

1. In a control system for a combined heating-cooling air conditioning unit for a building or the like including a heating section having a burner, and a cooling section, pilot means for igniting the burner, and igniter means for igniting said pilot means, thermostat means for selectively controlling both the heating and cooling sections depending on the setting of the thermostat means, pilot switch means coupled to said thermostat means and to said igniter means to control the energization of said igniter means for energizing said igniter means when said thermostat means calls for heat and for deenergizing said igniter means when said thermostat means calls for cooling.

2. A system in accordance with claim 1 wherein said heating section includes heat exchanger means around which air passes for heating the air during a heating cycle of said heating section, and around which air passes during a cooling cycle of said cooling section, said pilot means being adapted to communicate with said heat exchanger means.

3. A system in accordance with claim 1 including pressure switch means coupled to said igniter means for permitting energization of said igniter means only if the gas pressure to said pilot means is of a predetermined value.

4. A system in accordance with claim 1 including a combustion blower for the heating-cooling unit for exhausting combustion gases from the unit during a heating cycle, and fluid pressure responsive switch means disposed in the flow stream of said combustion blower and operatively coupled to electro-responsive control means for controlling the flow of fuel to the burner of said unit, for shutting off the flow of fuel to the burner in the event that said flow of combustion gases is interrupted.

5. A system in accordance with claim 4 including meltable fuse means in circuit with said electro-responsive control means and adapted to actuate the last mentioned control means to shut off the flow of fuel to the burner in the event that the temperature in the unit exceeds a predetermined maximum.

6. A system in accordance with claim 1 including electro-responsive control means coupled to said pilot means and to said burner for controlling the flow of fuel to said pilot means and said burner, and means mounted on said unit and in circuit with said electro-responsive control means for shutting down the flow of fuel to said pilot means and said burner if the temperature in said unit exceeds a predetermined maximum.

7. A system in accordance with claim 4 including relay means coupled in circuit with said pilot switch means and said combustion blower means for initiating energization of said combustion blower means upon energization of said pilot switch means.

8. A system in accordance with claim 1 in combination with said combined heating-cooling unit, the latter including a housing with a heating section in the upper portion of the housing and a cooling section in the lower portion of the housing, said heating section including heat exchanger means around which air passes for heating the air during a heating cycle, and around which air passes during a cooling cycle; said pilot means communicating with said heat exchanger means and being operative to ignite said burner only during a heating cycle as controlled by said thermostat means.

9. The combination of claim 8 including combustion blower means mounted on an intermediate wall of said housing in said heating section, and operative to vent gases of combustion from said heat exchanger means during a heating cycle.

10. The combination in accordance with claim 9 including thermocouple means adjacent said pilot means for initiating energization of said combustion blower means upon predetermined heating of said thermocouple means by said pilot means; and after ignition of said pilot means by said igniter means, said thermocouple means being operative to deenergize said igniter means upon energization of said combustion blower means.

References Cited
UNITED STATES PATENTS

| | | | |
|---|---|---|---|
| 2,966,342 | 12/1960 | Newton | 165—26 |
| 3,116,786 | 1/1964 | Menditch | 156—26 |
| 3,228,458 | 1/1966 | Brown | 165—26 |
| 3,277,947 | 10/1966 | Gacioch | 126—110 |

WILLIAM J. WYE, *Primary Examiner.*

U.S. Cl. X.R.

165—27; 431—31, 46